May 31, 1938. B. L. M. VAN DER LANDE ET AL 2,119,188
PROCESS FOR AERATING LIQUIDS IN THE PRODUCTION OF YEAST
Filed Dec. 27, 1935
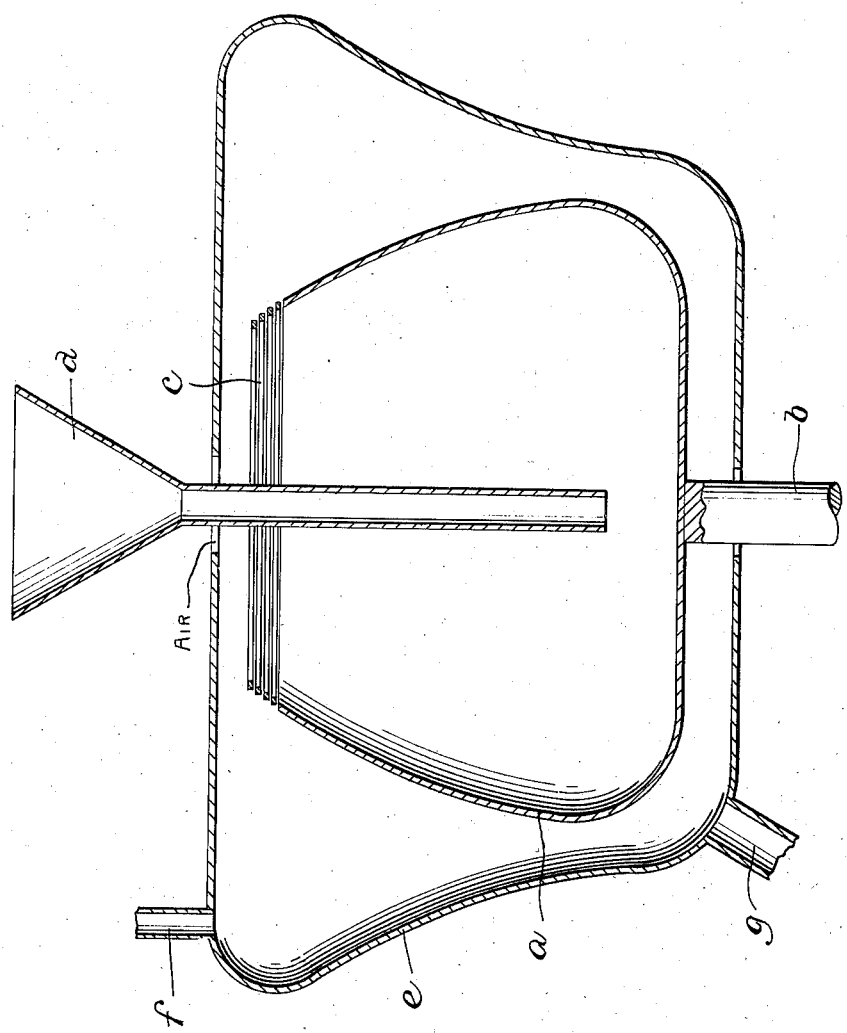
INVENTORS
B.L.M. van der Lande
Emile van Thiel,
BY
Foster Codier
ATTORNEYS Patented May 31, 1938

2,119,188

UNITED STATES PATENT OFFICE

2,119,188

PROCESS FOR AERATING LIQUIDS IN THE PRODUCTION OF YEAST

Bernardus Lebuinus Maria van der Lande and Emile van Thiel, Compiegne, France, assignors to Naamlooze Venootschap Industrieele Maatschappij Voorheen Noury & Van Der Lande, Deventer, Netherlands, a company of the Netherlands Application December 27, 1935, Serial No. 56,400
In the Netherlands December 29, 1934

3 Claims. (Cl. 195—95)

The present invention relates to the aerating process in the production of yeast, by introducing into a nutrient medium oxygen gas as it occurs in ordinary air or oxygen enriched air.

It has been tried already in several ways, to cut down this large quantity of air, for example, by blowing the air into the liquid through plates made of ceramic material that have extremely fine pores.

According to another method air is pressed into the fermenting liquid by means of ejectors; still a newer method is to perform the fine division of the air in the fermenting liquid by means of an agitator.

All the processes hitherto applied possess the important drawback, that large quantities of air have to be compressed, which requires an extremely high amount of power. It stands to reason that the costs of production are markedly increased by this high consumption of power.

We have now found that air may be supplied to the nutrient liquids, in a very economic way, i. e., with the smallest possible consumption of power, by introducing the air into the said liquids in the form of an air-in-liquid dispersion manufactured in a special manner. We have found that by spraying a suitable liquid in air, preferably of atmospheric pressure, and collecting the mist thus obtained, an air-in-liquid dispersion of remarkable stability is produced, in which the subdivision of the air is very great, that is: the bubbles of air are very small and therefore the air introduced has a large surface.

If such a dispersion is added to a liquid in which yeast is growing, the air bubbles owing to their smallness rise very slowly to the surface of the fermenting liquid and the oxygen of the air is for this reason utilized to a much higher degree than in the processes hitherto known in which the air is introduced into the fermenting liquid escapes rapidly.

If desired, the air-in-liquid suspension may again be subjected, once, twice or more times, to the same operation before being added to the fermenting liquid, in order to make the subdivision of the air still finer, so that the aeration process becomes still more efficient.

It is a matter of course that preferably such liquids are used for making the dispersions which give more stable air-in-liquid suspensions.

Suitable liquids are, for example, found amongst the liquids which are normally used in the manufacture of yeast. As an example, molasses may be mentioned from which according to the method described, stable air-in-liquid dispersions may be obtained.

If necessary, the molasses is diluted prior to the dispersion treatment and/or subjected to a purification or clarification process, in order to facilitate the dispersion process.

Moreover, well-known stabilizers for these suspensions may be added, for example, carbohydrates, sugars, glycerol, higher alcohols and other emulsifying agents.

It is of course necessary, that those added substances do not unfavourably affect the reactions that take place under circumstances prevailing in the process or that they retard the multiplication of or are harmful to the properties of the yeast produced; e. g., they may not decrease the fermentative and reproduction power of the yeast.

We have further found that the stability of the air-in-liquid suspensions is also dependent on the hydrogen ion concentration, so that the dispersing process is preferably carried out at such a hydrogen ion concentration of the liquid, that the stablest air-in-liquid suspensions are obtained.

In practice preferably such substances will be subjected to the dispersing process, that belong to the classes of substances which, for other reasons, must be added to the liquids in which the yeast propagating processes are taking place, either as nutrient liquid for or to stimulate the propagation of the yeast, to control the hydrogen-ion-concentration, to regulate the temperature or the dilution, and the like, or for more than one of these purposes.

In the production of yeast we may utilize molasses whether or not diluted with water, whether or not clarified as liquid for dispersing the air.

We may also withdraw a part of the liquid, to subject this part to the dispersing process, after, if desired, having it wholly or partly freed from yeast, to collect the dispersion and to add the air-in-liquid suspension thus obtained to the fermenting liquid.

If necessary, we do not treat a part, but the whole liquid in this way.

The dispersing treatment may be utilized to add stimulants for the yeast propagating processes, for example, by adding substances, such as chloroform or toluol or organic acids, in small proportions, to the air in which the liquid is sprayed, the said proportions being so chosen, that they favourably influence the yeast propagating processes, when the air-in-liquid suspension is added to the fermenting liquid. The air may be sterilized before being emulsified, e. g., by heating.

A suitable apparatus for manufacturing the air-in-liquid dispersion used in our process is illustrated in the accompanying drawing; a description of the various elements of the apparatus illustrated by the drawing will be given at this point in order to enable a more perfect understanding of our invention and the preferred method of carrying it out.

*a* is a bowl of nearly cylindric form, with convex sidewalls. The bowl *a* is mounted on a shaft *b* that makes 5,000–12,000 revolutions per minute. At the top of the bowl a number of rings *c* is mounted and connected with each other in such a way, that between them extremely narrow orifices are left, for example 0.1 mm. Depending on the method of connecting the rings these orifices may have a round, an oblong, or another form.

In operating the apparatus the liquid to be dispersed is allowed to enter into the rotating bowl through the funnel *d*. The liquid is subjected to a centrifugal action by which any sludge that might be present and that would clog up the orifices between the rings is separated from the liquid and collected in the convex parts of the bowl. The sludge-free liquid mounts to the top of the bowl where it is thrown through the narrow apertures and leaves the bowl in the form of extremely fine droplets. The droplets are thrown at a very high speed into the air chamber *e* surrounding the bowl. In this air chamber the particles of liquid collide with the air molecules in this way extremely fine air bubbles enveloped by liquid are formed. The dispersion thus obtained is collected against the wall of *e* and leaves the apparatus at *g*. Fresh air in replacement of the dispersed air can flow freely through an opening *f* or through the opening through which the funnel is passing in *e*.

A specific example of the liquid which we may use in preparing our air-liquid suspension, is beet sugar molasses diluted with water to a specific gravity of 1.10. To this molasses we add 1 gram of dextrin per kilogram of the diluted molasses the said substance acting as a stabilizer. We further adjust the pH of the solution by adding alkali or acid until its value lies between 4.8 and 5.4. We may also add to the air such an amount of toluol that each kilogram of the air-in-liquid dispersion after treatment contains 0.001 gram of toluol that acts as a stimulant.

We withdraw preferably continuously from the total mass of fermenting solution of glucose regularly at the top of the fermentation vessel a small percentage, we subject it to the dispersing treatment described and we introduce the air-in-liquid suspension obtained at the bottom of the fermentation vessel into the fermenting liquid. This operation is carried out at such a speed that every hour the whole of the fermenting liquid passes through the dispersing apparatus.

The dimensions of the air-bubbles are from ¼ mm. to a few microns. The suspension collected from the apparatus in the above described method is a milky liquid and "breaks" slowly with the liberation of air. If this suspension is placed in a test tube about one half minute elapses, before at the bottom of the tube a separation of the dispersion into the components becomes visible by a beginning clearing up of the liquid.

When it is considered, that in the manufacture of yeast the height of the liquid in the fermenting vessel is often 3–4 meters it is clear that the air bubbles, that are introduced into the liquid at the bottom and in form of the said liquid-air suspension or emulsion that is to say, a two component colloidal system consisting of a liquid as the external or continuous phase and air as the disperse or internal phase, would require a long time to traverse the liquid from bottom to top, thereby, can be utilized to a much higher degree than air introduced in the form of the usual air bubbles, formed by passing air through some sort of porous or perforated material which traverse the liquid in a few seconds.

To provide good distribution of the air bubbles in the suspension throughout the mass of the nutrient medium, we preferably agitate the medium with a suitable stirring device. As an auxiliary means for providing good distribution and mixing of the air-in-liquid suspension in the nutrient medium, a relatively small amount of air may be bubbled through the nutrient medium and this air need not be finely divided. This air may be, say 5% of that required for the yeast undergoing propagation.

Numerous modifications of our invention are within the scope of the present specification. For example, instead of using molasses, commercial glucose or the substances specifically mentioned herein as the external phase of the air-in-liquid suspension or emulsion, we may use water containing emulsifying agents such as gelatin, agar-agar and the like. Or gelatin and agar-agar may be used as stabilizers of a molasses solution air emulsion.

What we claim is:

1. A process for propagating yeast which comprises introducing yeast cells into a nutrient medium comprising molasses and aerating the yeast by introducing into the nutrient medium containing the yeast a separately prepared air-in-liquid dispersion made by centrifuging a dilute molasses solution and rapidly projecting it into an air space where it collides with and envelops particles of air to produce a stable air-in-liquid dispersion in which the diameter size of the dispersed air particles is from a few microns to about ¼ of a millimeter.

2. The process of propagating yeast as set forth in claim 1 in which the pH of the nutrient medium is between about 4.8 and 5.4.

3. The process of propagating yeast as set forth in claim 1 in which a small amount of toluol is included in the air-in-liquid dispersion.

BERNARDUS LEBUINUS MARIA VAN DER LANDE.
EMILE VAN THIEL.